No. 734,837. PATENTED JULY 28, 1903.
J. EDGAR.
CHANGE FEED MECHANISM.
APPLICATION FILED MAR. 6, 1902.
NO MODEL. 2 SHEETS—SHEET 1.
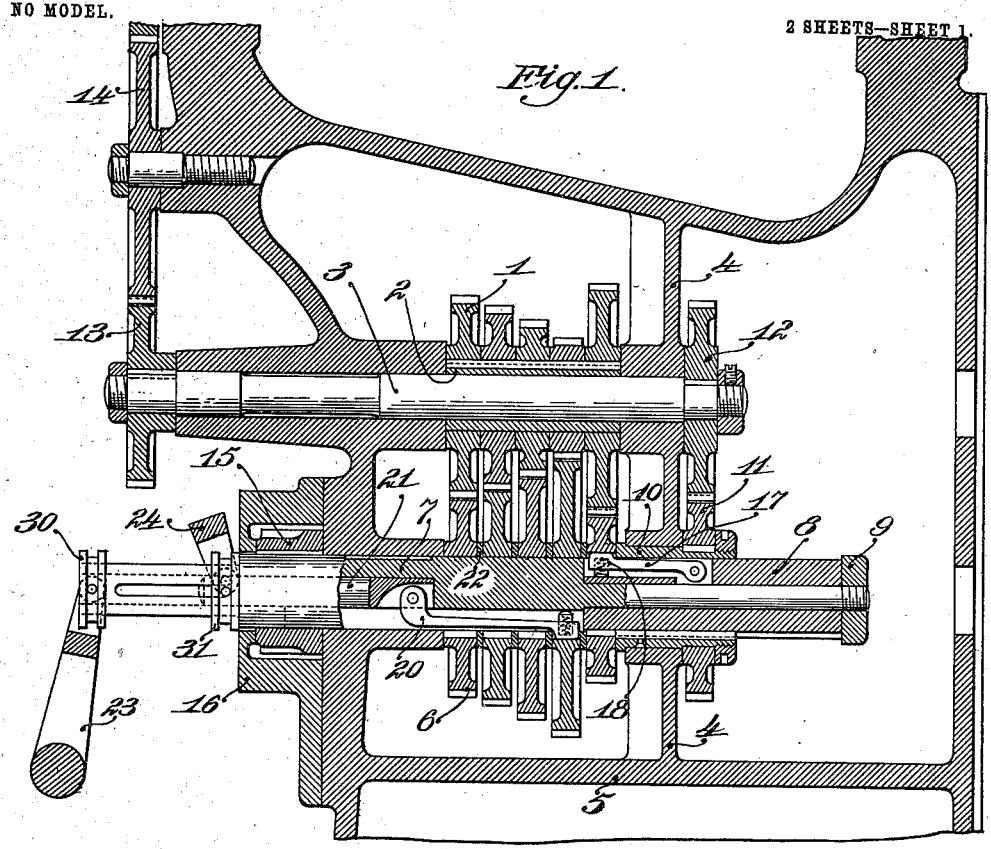
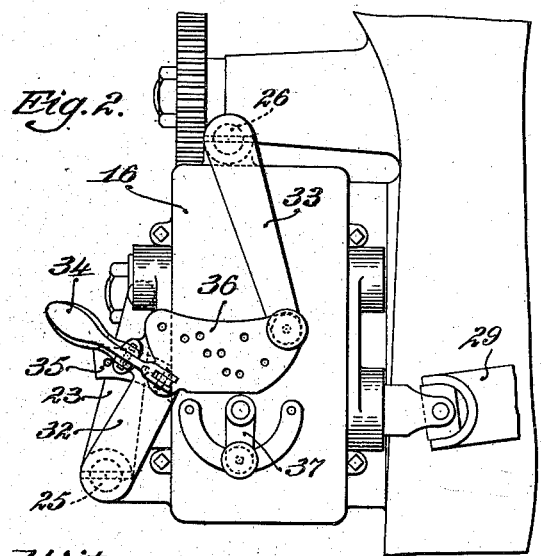
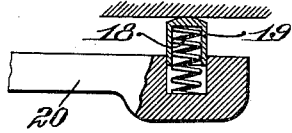
Witnesses
Edward S. Day
Fred C. Fish
Inventor
John Edgar
by his Attorney
Benjamin Phillips No. 734,837. PATENTED JULY 28, 1903.
J. EDGAR.
CHANGE FEED MECHANISM.
APPLICATION FILED MAR. 6, 1902.
NO MODEL.
2 SHEETS—SHEET 2.

Witnesses
Edward S. Day
Fred O. Fish

Inventor
John Edgar
by his Attorney
Benjamin Phillips

No. 734,837. Patented July 28, 1903.

UNITED STATES PATENT OFFICE.

JOHN EDGAR, OF HYDEPARK, MASSACHUSETTS, ASSIGNOR TO BECKER-BRAINARD MILLING MACHINE COMPANY, OF PORTLAND, MAINE, A CORPORATION OF MAINE.

CHANGE-FEED MECHANISM.

SPECIFICATION forming part of Letters Patent No. 734,837, dated July 28, 1903

Application filed March 6, 1902. Serial No. 96,917. (No model.)

*To all whom it may concern:*

Be it known that I, JOHN EDGAR, a subject of the King of the United Kingdom of Great Britain and Ireland, residing at Hydepark, in the county of Norfolk and State of Massachusetts, have invented certain new and useful Improvements in Change-Feed Mechanism; and I do hereby declare the following to be a full, clear, and exact description of the invention, such as will enable others skilled in the art to which it appertains to make and use the same.

The present invention relates to an improved change-feed mechanism, and more particularly to a change-feed mechanism comprising two series of change-feed gears.

The invention is particularly designed for use in connection with horizontal or vertical milling-machines, but is also adapted for use in connection with other types of machine-tools or in other relations.

The object of the invention is to provide a change-feed mechanism comprising two series of change-speed gears, by which a greater number of different speeds can be obtained than has heretofore been possible.

With this object in view my invention consists of a change-feed mechanism comprising a series of gears mounted to rotate in unison, hereinafter referred to as a series of "connected" gears, a series of gears mounted to rotate independently of each other, hereinafter referred to as a series of "independent" gears, a driving member, a driven member, and means for connecting each of two or more of the gears of the series of independent gears to the driving member and for connecting each of two or more of said gears to the driven member, whereby the gears of the series of independent gears may be used to drive the series of connected gears at different speeds and may also be used to drive the driven member at different speeds for each speed of the series of connected gears.

My invention also consists in the devices and combination of devices hereinafter described and claimed, the advantages of which will be obvious to those skilled in the art from the following description.

The preferred form of my invention is illustrated in the accompanying drawings, in which—

Figure 3:
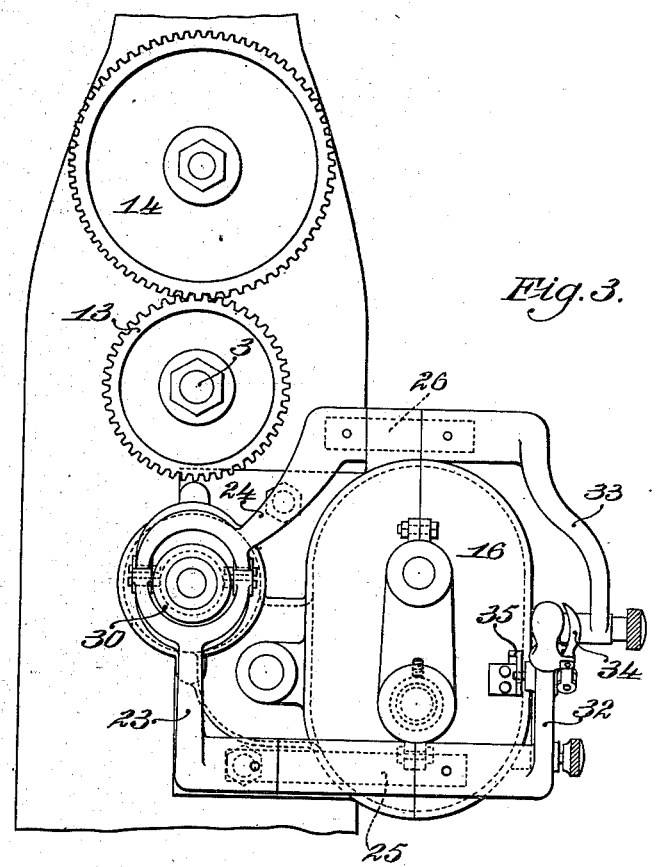
Figure 4:
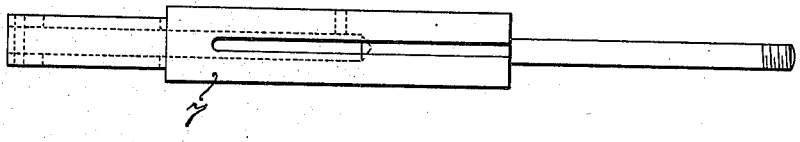

Figure 1 is a view in longitudinal section of a portion of a horizontal milling-machine provided with a change-feed mechanism embodying the same. Fig. 2 is a view in side elevation of a portion of the machine illustrated in Fig. 1. Fig. 3 is a rear view of so much of the machine as is shown in Figs. 1 and 2. Fig. 4 is a detail view showing the shaft upon which the series of independent gears are mounted detached, and Fig. 5 is a detail view of one of the locking-pawls.

Referring to the drawings, 1 indicates a series of change-speed gears secured to a sleeve 2, mounted upon a shaft 3, journaled in bearings in the rear wall of the column of the machine and in a vertical web 4, connecting the upper wall of the column and a cross-web 5. The gears of the series 1, by being secured to the sleeve 2, are connected together so as to rotate in unison, and this series of gears may therefore be conveniently termed a series of "connected" gears. Meshing with the gears of series 1 is a series of gears 6, which are mounted to rotate independently of each other upon a shaft 7, and this series of gears may be conveniently termed a series of "independent" gears. The outer end of the shaft 7 is journaled in a bearing in the rear wall of the column and the inner end is provided with a reduced portion upon which is mounted a sleeve 8, so as to rotate loosely thereon, the sleeve being held from longitudinal movement with relation to the shaft by means of a nut 9 on the end of the reduced portion of the shaft. The sleeve 8 passes through and has a splined connection with a sleeve 10, journaled in bearings in the web 4. To the sleeve 10 is secured a gear 11, which meshes with a gear 12, secured to the inner end of the shaft 3. To the outer end of the shaft 3 a gear 13 is secured, which meshes with a gear 14, which is driven from the main driving-shaft of the machine. The shaft 7 is mounted in its bearing in the rear wall of the column, so as to be movable longitudinally, and splined upon the shaft is a pinion 15, which is held from longitudinal movement with the shaft by means of the surrounding portion of the casing 16, which incloses the gearing through which the movement of the shaft 7 and pinion 15 is transmitted to the feeding-shaft of the machine. The sleeve 8 is rotated from the main driving-shaft of the machine through the gears 14 and 13, the shaft 3, the gears 12 and 11, and the sleeve 10.

Means are provided for connecting the gears of series 6 to the sleeve 8, which thus constitutes a driving member for directly driving the gear of series 6 to which it is connected and for indirectly driving the remaining gears of series 6 through the series 1 of connected gears. Means are also provided for connecting the gears of series 6 to the shaft 7 which thus constitute a driven member which is driven from the driving member through two of the gears of series 6 and the gears of series 1. The means for connecting the gears of series 6 to the sleeve 8 consists of a spring-pressed locking-pawl 17, pivotally mounted in a slot in the sleeve and pressed outwardly by means of a coiled spring 18. The spring 18 is held in position by being seated in a recess in the locking-pawl and in a recess in a block 19, mounted to slide in the recess in the locking-pawl, as clearly shown in Fig. 5. The hubs of the gears of series 6 are provided with slots or keyways which receive the projecting end of the locking-pawl 17 when the pawl is moved opposite said slots as the shaft 7 and the sleeve 8, mounted thereon, are moved longitudinally. The means for connecting the gears of series 6 to the shaft 7 consists of a locking-pawl 20, similar in construction to the pawl 17 and pressed outwardly by similar means. This pawl is located in a slot in the shaft 7 and is pivotally mounted upon a rod 21, mounted to slide longitudinally in the shaft 7. In order to prevent the pawls 17 and 20 from engaging two adjacent gears simultaneously, separator-rings 22 are interposed between the hubs of the gears.

In the construction above described it will be seen that the pawl 17 can be moved into a position to engage any one of the series of gears 6 except the outside gear at the left by moving the shaft 7 and sleeve 8 longitudinally and that the pawl 20 can be moved independently of the pawl 17 into a position to engage any one of the gears at the left of the gear engaged by the pawl 17 by moving the rod 21 longitudinally of the shaft 7. The speed imparted to the shaft 7 and pinion 15 will depend upon which gears are engaged by the pawls 17 and 20, and it will be evident without further description that ten different speeds can be imparted to the shaft 7 and pinion 15 by means of the construction shown in the drawings, in which the gears of series 6 are five in number. By increasing the number of gears in the series 6 and providing a corresponding number of gears in the series 1 the number of speeds which can be imparted to the shaft 7 and pinion 15 may be increased. By providing means whereby the gears of the series of independent gears can be utilized to drive the series of connected gears directly and through the series of connected gears to drive the member from which motion is imparted to the feed-shaft the number of speeds which can be obtained by means of the two series of change-speed gears is greatly increased over the number of speeds that can be obtained by change-feed mechanisms comprising two series of change-speed gears as heretofore constructed, in which the gears of the series of independent gears are only utilized to transmit the movement of the series of connected gears to the member through which the feed-shaft is driven. In a change-feed mechanism comprising two series of change-speed gears as heretofore constructed but five speeds can be imparted to the member through which the feed-shaft is driven when the gears of the series of independent gears are five in number, whereas in the construction illustrated in the drawings twice this number of speeds can be imparted to the member through which the feed-shaft is driven by the use of the same number of independent gears.

In order to move the shaft 7 and sleeve 8 longitudinally and move the rod 21 longitudinally with relation to the shaft 7, two lever-arms 23 and 24 are provided, which are secured to rock-shafts 25 and 26, respectively, journaled in projections from the casing 16, which incloses the pinion 15 and the gearing through which the motion of the pinion 15 is imparted to the feed-shaft 29. The free end of the lever-arm 23 is forked and is provided with pins which engage a grooved collar 30, secured to or formed integral with the reduced outer end of the shaft 7, and the free end of the lever-arm 24 is also forked and engages in a similar manner a grooved collar 31, mounted to slide on the reduced outer end of the shaft 7 and connected to the rod 21 by means of a pin passing through a slot in the shaft. Also secured to the rock-shafts 25 and 26, respectively, are hand-levers 32 and 33. A latch-lever 34 is pivotally mounted upon the lever 32 and is connected to a locking-pin mounted to slide in the lever 32. A segmental plate 35 is secured to the casing 16 and is provided with a series of holes arranged to be engaged by the pin and lock the lever 32 in any one of four different positions, such positions of the lever 32 being the positions which the lever assumes as the locking-pawl 17 is brought into engagement with the several gears of series 6. An indicator-plate 36 is secured to or formed integral with the lever 32 and is provided with a number of holes with which a locking-pin on the free end of the lever 33 is arranged to engage, said holes being ten in number, which is the number of different speeds which can be obtained by means of the change-speed mechanism illustrated in the drawings, and being arranged in four series. These series of holes are brought successively into position to cooperate with the locking-pin in the free end of lever 33 as the lever 32 is moved to successively bring the locking-pawl 17 into engagement with the gears of series 6. The holes of the upper series are four in number and indicate the positions to which the lever 33 must be moved in order to bring the pawl 20 successively into engagement with the four gears of the series 6 at the left of the gear engaged by the pawl 17 when the pawl 17 is in engagement with the gear at the right-hand end of the series. The holes of each of the remaining series are successively one less in number than the series immediately above it and indicate the positions to which the lever 33 must be moved in order to bring the pawl 20 into engagement with the gears of series 6 at the left of the gear engaged by the pawl 17.

The gearing for transmitting the movement of the pinion 15 to the feed-shaft 29 is not illustrated in the drawings, as it forms no part of the present invention and may be of any desired construction. The hand-lever 37, which is shown in Fig. 2, is the lever by means of which the gearing which connects the pinion 12 to the shaft 29 may be thrown out of operation or connected, so as to drive the shaft 29 at two different speeds for each speed of the pinion 15, in a manner well known in the art.

It is to be understood that the change-feed mechanism illustrated in the drawings and above described embodies my invention in the best form at present known to me, but that except as specifically recited in the claims my invention is not limited to the details of construction illustrated and described, but that it may be otherwise embodied without departing from the spirit thereof. It is also to be understood that I consider the construction above described for actuating the devices which connect the gears of the series of independent gears to the driving and driven members, comprising the levers 32 and 33 and the indicator-plate 36, to be broadly new and not limited to use with the form of change-feed mechanism illustrated, and that, broadly considered, the invention therein embodied would likewise be embodied in any construction comprising two hand-operated members and intermediate connections for actuating the devices which connect the gears of a change-speed mechanism to the driving and driven members and an indicator for one of said hand-operated members actuated by the other member.

Having thus described my invention, I claim as new and desire to secure by Letters Patent of the United States—

1. A change-feed mechanism, having, in combination, a series of connected gears, a series of independent gears, a driving member, a driven member, and means for connecting any two gears of the series of independent gears to the driving and driven members respectively, substantially as described.

2. A change-feed mechanism, having, in combination, a series of connected gears, a series of independent gears, a driving member, a driven member, means for connecting each of two or more of the gears of the series of independent gears to the driving member and for connecting each of two or more of said gears to the driven member, substantially as described.

3. A change-feed mechanism, having, in combination, a series of connected gears, a series of independent gears, a driving member, a driven member, means for connecting two of the gears of the series of independent gears to the driving and driven members respectively and for connecting each of the intermediate gears to either the driving or driven member, substantially as described.

4. A change-feed mechanism, having, in combination, a series of connected gears, a series of independent gears, a longitudinally-movable shaft upon which the independent gears are mounted, a sleeve mounted thereon, and means carried by the shaft and sleeve for connecting the gears thereto, substantially as described.

5. A change-feed mechanism, having, in combination, a series of connected gears, a series of independent gears, a longitudinally-movable shaft upon which the independent gears are mounted, a sleeve mounted thereon, devices carried by the shaft and sleeve for connecting the gears thereto, said devices being relatively movable longitudinally of the shaft and sleeve, substantially as described.

6. A change-feed mechanism, having, in combination, a series of connected gears, a series of independent gears, a longitudinally-movable shaft upon which the independent gears are mounted, a sleeve mounted thereon, a spring-pressed locking-pawl carried by the sleeve for connecting the gears to the sleeve, and a rod mounted to move longitudinally of the shaft provided with a spring-pressed locking-pawl for connecting the gears to the shaft, substantially as described.

7. A change-feed mechanism, having, in combination, a series of connected gears, a series of independent gears, a longitudinally-movable shaft upon which the independent gears are mounted to rotate, a sleeve mounted thereon, means carried by the shaft and sleeve for connecting the gears thereto, a shaft upon which the connected gears are mounted loosely, means for rotating said shaft, and gearing connecting said shaft and sleeve, substantially as described.

8. A change-feed mechanism, having, in combination, a series of connected gears, a series of independent gears, a longitudinally-movable shaft upon which the independent gears are mounted, a sleeve mounted thereon, devices carried by the shaft and sleeve for connecting the gears thereto one of said devices being movable longitudinally of the shaft and sleeve, a lever and connections for moving the shaft and sleeve longitudinally, and a lever and connections for moving said movable device, one of said levers being provided with means for indicating the proper positions for the other lever, substantially as described.

9. A change-feed mechanism, having, in combination, a driving and a driven member, change-gearing intermediate said members, devices for connecting the gears of the change-gearing to said members to produce a plurality of different speeds of the driven member for a given speed of the driving member, two levers and intermediate connections for actuating said devices, and an indicator for one of the levers actuated by the other lever, substantially as described.

10. A change-feed mechanism having, in combination, a driving and a driven member, change-gearing intermediate said members, devices for connecting the gears of the change-gearing to said members to produce a plurality of different speeds of the driven member for a given speed of the driving member, two levers and intermediate connections for actuating said devices and an indicator for one of the levers carried by the other lever, substantially as described.

11. A change-feed mechanism, having, in combination, a driving and a driven member, change-gearing intermediate said members, devices for connecting the gears of the change-gearing to said members to produce a plurality of different speeds of the driven member for a given speed of the driving member, two hand-operated members and intermediate connections for actuating said devices and an indicator for one of said members actuated by the other member, substantially as described.

In testimony whereof I affix my signature in presence of two witnesses.

JOHN EDGAR.

Witnesses:
L. E. HARPER,
N. L. LOVEJOY.